US007610894B2

(12) United States Patent
Tinker

(10) Patent No.: US 7,610,894 B2
(45) Date of Patent: Nov. 3, 2009

(54) SELF-COMPENSATING CYLINDER SYSTEM IN A PROCESS CYCLE

(75) Inventor: Frank A. Tinker, Tucson, AZ (US)

(73) Assignee: FSNC, LLC, Tucson, AZ (US)

( * ) Notice: Subject to any disclaimer, the term of this patent is extended or adjusted under 35 U.S.C. 154(b) by 336 days.

(21) Appl. No.: 11/807,065

(22) Filed: May 25, 2007

(65) Prior Publication Data

US 2007/0227347 A1 Oct. 4, 2007

Related U.S. Application Data

(60) Provisional application No. 60/811,347, filed on Jun. 6, 2006, now abandoned.

(51) Int. Cl.
*F02B 75/18* (2006.01)
*F16C 7/06* (2006.01)

(52) U.S. Cl. ................ 123/197.3; 123/48 B; 123/78 E; 123/53.6; 123/56.3

(58) Field of Classification Search ............... 123/48 B, 123/53.3, 53.6, 55.2, 56.3, 56.6, 78 E, 197.3, 123/197.4
See application file for complete search history.

(56) References Cited

U.S. PATENT DOCUMENTS 717,445 A * 12/1902 Nestius ........................ 91/498
1,456,479 A * 5/1923 McKenzie et al. ............ 60/624
1,990,660 A * 2/1935 McCann ...................... 123/21
2,120,657 A * 6/1938 Tucker ...................... 123/54.3
2,248,323 A * 7/1941 Anthony ................... 123/78 E
2,249,951 A * 7/1941 Fulton ........................... 74/55
3,161,183 A * 12/1964 Leath ........................ 123/43 C
3,438,358 A * 4/1969 Porsch et al. ............... 123/241
3,604,402 A * 9/1971 Hatz ......................... 123/55.3
3,841,279 A * 10/1974 Burns ....................... 123/43 C
3,931,810 A * 1/1976 McGathey ................ 123/44 E
4,003,351 A * 1/1977 Gunther .................... 123/44 R
4,111,164 A * 9/1978 Wuerfel .................... 123/78 E
4,177,771 A * 12/1979 Nutku ...................... 123/43 C
4,334,506 A * 6/1982 Albert ...................... 123/51 B
4,727,794 A * 3/1988 Kmicikiewicz ............. 91/491
4,966,109 A 10/1990 Pusic et al.
5,077,976 A 1/1992 Pusic et al.
5,211,138 A * 5/1993 Murray et al. ............ 123/44 B
5,228,294 A * 7/1993 Murray ........................ 60/709
5,343,832 A * 9/1994 Murray ..................... 123/44 B
5,529,029 A * 6/1996 Rowe et al. ................ 123/54.3
5,634,441 A * 6/1997 Ragain ...................... 123/54.3
5,724,863 A * 3/1998 Kramer et al. ................ 74/583
6,202,622 B1 3/2001 Raquiza, Jr.
6,213,082 B1 * 4/2001 Ohori ...................... 123/197.3
6,223,703 B1 * 5/2001 Galvin ..................... 123/48 B
6,467,373 B1 * 10/2002 El Tahry et al. ............ 74/579 E
6,499,445 B2 * 12/2002 Han ......................... 123/45 R (Continued)

*Primary Examiner*—Hai H Huynh
(74) *Attorney, Agent, or Firm*—Antonio R. Durando

(57) ABSTRACT

The efficiency of a multi-cylinder engine is optimized by coupling the volume change in each cylinder to a common coordinate under conditions such that, at each point in the engine's cycle, the energy necessary to produce a differential volume change is reduced substantially to zero. Each cylinder is coupled to the common coordinate through a cam or through a variable-length connecting rod. The same efficiency optimization may be achieved with various combinations of cylinders in a two-cycle engine, a four-cycle engine, or a multi-cylinder compressor.

35 Claims, 7 Drawing Sheets

U.S. PATENT DOCUMENTS 6,604,496 B2 * 8/2003 Bartsch et al. ............ 123/78 E
6,691,648 B2 * 2/2004 Beierle ...................... 123/54.3
6,764,285 B1 * 7/2004 Kellner ....................... 417/470
6,796,284 B1 * 9/2004 Von Wielligh ........... 123/197.1
7,004,121 B2 * 2/2006 Moe et al. .................. 123/56.2
7,219,633 B1 * 5/2007 McLeod .................... 123/56.6
7,475,627 B2 * 1/2009 Irick et al. .................... 92/138
2007/0199525 A1 * 8/2007 Skulic ....................... 123/54.3
2009/0038565 A1 * 2/2009 Asender .................... 123/55.5

* cited by examiner

SELF-COMPENSATING CYLINDER SYSTEM IN A PROCESS CYCLE

RELATED APPLICATIONS

This application is based on and claims the priority of Provisional Application No. 60/811,347, filed on Jun. 6, 2006, and is a continuation-in-part application of U.S. Ser. No. 11/129,783, filed on May 16, 2005.

BACKGROUND OF THE INVENTION

1. Field of the Invention

The invention relates in general to apparatus for improving the efficiency of heat engines, in particular to mechanisms that couple at least two enclosures, such as engine cylinders, to eliminate the work required to effect a change in the volume and pressure of compressible substances contained therein.

2. Description of the Prior Art

U.S. patent application Ser. No. 11/129,783, hereby incorporated by reference in its entirety, describes the discovery that work done in the cyclic, and repeatable, compression of a substance (such as a gas) is relevant to the efficiency of the process involving such compression. This relevance prompted the realization that eliminating the work done in compressing the gas would result in an increase in the overall efficiency at which such a process could be performed.

Ser. No. 11/129,783 teaches that compression/decompression work in an engine can be eliminated, for example, by employing the compression of another substance to counter the work necessary to compress the working gas in the engine. This disclosure teaches a particular implementation of that concept. As explained in further detail below, U.S. Pat. No. 6,202,622, No. 5,077,976 and No. 4,966,109 teach various crank systems with variable-length connecting rods that may be used advantageously to implement the present invention. Therefore, these patents are also hereby incorporated by reference in their entirety.

BRIEF SUMMARY OF THE INVENTION

This invention is directed at accomplishing the purposes of the above-referenced patent application in a heat engine that comprises at least two enclosures. The enclosures are coupled in such a manner that the work necessary to effect the required change in volume occurring simultaneously in all enclosures is eliminated. Using conventional analysis, if the pressure, p, within an enclosure is a piece-wise repeatable function of the enclosure's volume, V, i.e., $$p=p(V), \tag{1}$$

then the work related to an infinitesimal change in this volume is given by $$dw=(p_a-p(V))dV, \qquad (2))$$

where $p_a$ represents the ambient pressure surrounding the enclosure. If an assembly of enclosures is coupled such that their volumes are all related to some common coordinate, α (for instance, the rotational position of a common crankshaft), then the total work resulting from an infinitesimal change in that coordinate is given by the relation $$dw = d\alpha\sum_n [p_a - p_n[V_n(\alpha)]]\frac{\partial V_n}{\partial\alpha}, \tag{3}$$

where the subscript n identifies the enclosure.

Therefore, the equation for the generalized force associated with the work of such a system can be written as [from dw=f(α)dα]:

$$f(\alpha) = \sum_n [p_a - p_n[V_n(\alpha)]]\frac{\partial V_n}{\partial\alpha}, \tag{4}$$

for which there is at least one coupling arrangement such that $$f^*(\alpha) = \sum_n [p_a - p_n[V_n^*(\alpha)]]\frac{\partial V_n^*}{\partial\alpha} = 0, \tag{5}$$

where the asterisk * indicates the zero-force condition. That is, there is at least one coupling configuration as a result of which no net force is required to effect the infinitesimal change in the coordinate α (and a corresponding infinitesimal change in all enclosures' volumes) and, therefore, the work required to change the volumes of the enclosures vanishes.

According to the discovery described in Ser. No. 11/129,783, such a coupling configuration will provide the maximum efficiency achievable with any heat engine comprising such enclosures. Equation 5 can be implemented by designing a mechanism that couples the common coordinate, α, and an enclosure volume, $V_n$, such that $$[p_a - p_n[V_n^*(\alpha)]]\frac{\partial V_n^*}{\partial\alpha} = \sum_m \begin{pmatrix} a_m\cos^{2m}(\alpha-\varphi_n)\sin(\alpha-\varphi_n) + \\ b_m\sin^{2m}(\alpha-\varphi_n)\cos(\alpha-\varphi_n) \end{pmatrix}, \tag{6}$$

where $\phi_n$ is the phase of the enclosure in the cycle of the system, and a, b and m are the coefficients and index, respectively, of the series that produces the identity of Equation 6. Under such a constraint, any two enclosures, d and e, for example, having such an α-dependent volume variation and a phase relationship $$\phi_d-\phi_e=\pm\pi \tag{7}$$

will combine according to Equation 5 as $$\begin{aligned} &\sum_m \begin{pmatrix} a_m\cos^{2m}(\alpha)\begin{pmatrix}\sin(\alpha)+\\ \sin(\alpha+\pi)\end{pmatrix} + \\ b_m\sin^{2m}(\alpha)\begin{pmatrix}\cos(\alpha)+\\ \cos(\alpha+\pi)\end{pmatrix} \end{pmatrix} \\ &= \sum_m \begin{pmatrix} a_m\cos^{2m}(\alpha)\begin{pmatrix}\sin(\alpha)-\\ \sin(\alpha)\end{pmatrix} + \\ b_m\sin^{2m}(\alpha)\begin{pmatrix}\cos(\alpha)-\\ \cos(\alpha)\end{pmatrix} \end{pmatrix} \\ &= 0. \end{aligned} \tag{8}$$

Note that Equation 8 reflects the following well understood identities:

$$\cos(\alpha\pm\pi)=-\cos(\alpha) \text{ and } \sin(\alpha\pm\pi)=-\sin(\alpha)$$

therefore, $$[\cos(\alpha\pm\pi)]^{2m}=\cos(\alpha) \text{ and } [\sin(\alpha\pm\pi)]^{2m}=\sin(\alpha)$$

The pressure and volume of gases employed in practical heat engines are frequently well-characterized by polytropic relations taking the form $$pV^k=c \tag{9}$$

where c is some constant related to the initial conditions of the system and k is a constant related to the thermal properties of the gas. Using this relationship in Equation 6 produces $$(p_a - p(V))\frac{dV}{d\alpha} = (p_a - p_i V_i^\kappa V^{-\kappa})\frac{dV}{d\alpha} = \sum_m \begin{pmatrix} a_m \cos^{2m}(\alpha-\varphi_n)\sin(\alpha-\varphi_n) + \\ b_m \sin^{2m}(\alpha-\varphi_n)\cos(\alpha-\varphi_n) \end{pmatrix}, \tag{10}$$

where $p_i$ and $V_i$ represent the reference pressure and volume of the enclosure. Equation 10 integrates to $$\begin{aligned} p_a(V-V_i) - \frac{p_i V_i}{1-\kappa}\left[\left(\frac{V_i}{V}\right)^{1-\kappa} - 1\right] &= p_a V_i\left[\left(\frac{V}{V_i} - 1\right) + \frac{1}{\kappa-1}\left[\left(\frac{V_i}{V}\right)^{1-\kappa} - 1\right]\right] \\ &= p_a V_i\left[(r^{-1} - 1) + \frac{p_i}{(\kappa-1)p_a}[r^{1-\kappa} - 1]\right], \\ &= \sum_m \begin{pmatrix} \frac{a_m}{2m+1}(\cos^{2m+1}(\alpha-\varphi_n) - 1) - \\ \frac{b_m}{2m+1}\sin^{2m+1}(\alpha-\varphi_n) \end{pmatrix} \end{aligned} \tag{11}$$

where $r=V_i/V$ and it is assumed that r=1 at $\alpha=\phi_n$.

Therefore, any two enclosures containing gases that behave in a manner consistent with Equation 9, whose volumes are coupled to the common coordinate as described by Equation 11 and whose phases differ by pi radians, will maximize the efficiency of the heat engine comprising them. This analysis can be extended in the same manner to 2N enclosures of any heat engine of interest.

The use of Equations 9-11 is instructive, but only as a theoretical estimate of the behavior of real gases employed in practical heat-engine implementation. The most obvious example of the deviation of real gas behavior from that given by Equation 9 is a condensing gas, such as that used in Rankine-style engines (steam engines, air conditioning units, etc.), where the working substance changes state from gas to liquid, and back again, based on the extent of its compression and its temperature. Therefore, in order to implement the present invention, the mean pressure/volume behavior of the working substance employed under the actual operating cycle is determined experimentally and that relationship is then inserted into Equation 6 to determine the necessary coupling between the common coordinate and the enclosure volume.

The extent of general applicability of Equation 6 will be readily understood by one skilled in the art. Integration of the equation yields a general Fourier series representation of any cyclic process having the desired property that, when combined with another process meeting the same condition with the two processes having a pi radian phase difference between them, will result in zero net work to effect a change in the common coordinate. Since any function can be transformed into a Fourier series representation that is identical in behavior to the original function, Equation 6 fully identifies every coupling arrangement that will result in the desired self-compensation.

Various other aspects and advantages of the invention will become clear from the description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

Figure 1:
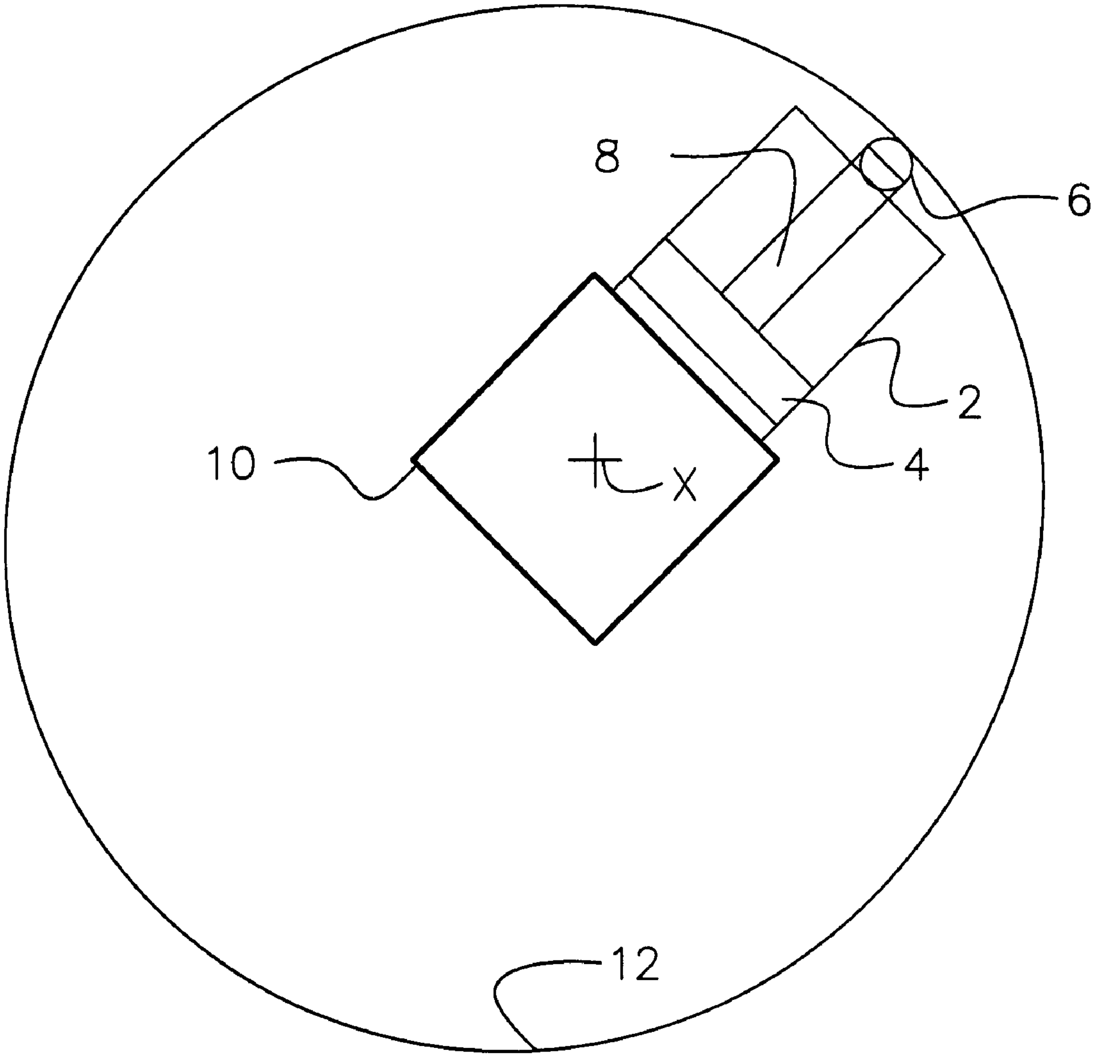
FIG. 1 shows a schematic representation of a single-cylinder cam-based implementation of the invention.

The vast majority of heat engines in practical use employ a piston/cylinder arrangement as the enclosure identified above. The piston position within its cylinder is used to effect a change in the volume of the enclosed substance. Without loss of generality, specific embodiments of the invention will be described for such piston/cylinder systems. However, it is understood that other variable-volume enclosures are only extensions of the embodiments shown below and are intended to be covered by the principles of this invention. It is also understood that all equations derived in this disclosure are applicable to and precisely correct for a friction-free environment. The same analysis, however, holds true also when friction is accounted for. That is, a system compensated according to the invention will achieve maximum efficiency, as described, but somewhat reduced from the maximum theoretical value as a result of friction.

The least complex, non-trivial, version of Equation 6 is given by $$p_n[V_n^*(\alpha)]\frac{\partial V_n^*}{\partial \alpha} = \sin(\alpha - \varphi_n), \tag{12}$$

which leads to the general integral equation $$\int p_n(V_n^*)\partial V_n^* = a(\cos(\alpha - \varphi_n) - 1). \tag{13}$$

The general procedure for finding the appropriate coupling for a given system is to experimentally determine pressure as a function of volume for the substance and process of interest.

Once so found, numerical integration of these data is performed and a solution to Equation 13 is numerically identified. This solution is then implemented in a mechanical embodiment to realize the invention.

For example, the design of a piston heat engine involves the identification of a stroke volume, compression ratio, and working substance suitable for the application. If a polytropic gas is identified as the appropriate working substance, then the pressure/volume relationship is given by Equation 9. Therefore, from Equations 11 and 13 one finds that $$p_a V_i\left[(r^{-1}-1)+\frac{p_i}{(\kappa-1)p_a}[r^{1-\kappa}-1]\right]=a(\cos(\alpha-\varphi_n)-1) \tag{14}$$

where a is the sole constant to be determined. At the maximum value of r (i.e., when $r=r_c$), $\alpha=\phi_n+\pi$, so that $$a=-0.5p_aV_i\left[(r_c^{-1}-1)+\frac{p_i}{(\kappa-1)p_a}[r_c^{1-\kappa}-1]\right]. \tag{15}$$

Therefore, it follows that $$\alpha(r)=\varphi_n+\mathrm{Cos}^{-1}\left[1-2\cdot\frac{\left[(r^{-1}-1)+\frac{p_i}{(\kappa-1)p_a}[r^{1-\kappa}-1]\right]}{\left[(r_c^{-1}-1)+\frac{p_i}{(\kappa-1)p_a}[r_c^{1-\kappa}-1]\right]}\right]. \tag{16}$$

Equation 16 provides the necessary information to design a minimally-complex self-compensated piston engine with known compression ratio and working gas. It identifies how the common coordinate behaves as a function of the ratio of the cylinder volume to its maximum value. If, for example, one assumes a compression ratio of 10, a reference cylinder pressure equal to ambient, and air (k=1.4) as the working gas, then Equation 16 becomes $$\alpha(r)=\phi_n+\mathrm{Cos}^{-1}\lfloor 1+0.8317\cdot\lfloor(r^{-1}-1)+2.5\lfloor r^{1-k}-1\rfloor\rfloor\rfloor \tag{17}$$

The following practical examples demonstrate how the invention can be implemented through mechanical compensation. It is understood that other embodiments are possible within the spirit and scope of the concept that is at the basis of the invention.

Cam Embodiment

One mechanical implementation of Equation 16 or Equation 17 involves the use of a cam to vary the piston position within the cylinder according to the compensation scheme of the invention. Since one desires to maintain the viability of the assumed polytropic behavior during rapid changes in cylinder volume, one must expect rapid traversals of this cam. If an external cam is used (an external cam is defined in the art as a cam system where the follower rides an outer cam surface), the inertia of the piston will limit the rate at which the piston can follow the cam while maintaining the pressure-induced normal force at the cam surface. An internal cam (i.e., one where the follower rides inside the cam surface), however, is not so limited because the centripetal acceleration of the piston due to the rotation rate of the rotor on which the cylinder is mounted will serve to overcome these inertia effects. Therefore, an internal cam implementation will be explored with the common coordinate, α, being identified as the rotation angle of the rotor on which the cylinders are mounted.

Such a configuration is represented schematically in FIG. 1 by an assembly comprising a single cylinder 2 with a pistons 4 connected to a cam follower 6 by a shaft 8. The assembly is fixed to a rotor 10 that rotates about its axis X. The cam follower rides the inner surface of a cam 12, thereby alternately compressing and decompressing the gas in the cylinder. The shape of the cam is determined from the solution of Equation 17.

Figure 2:
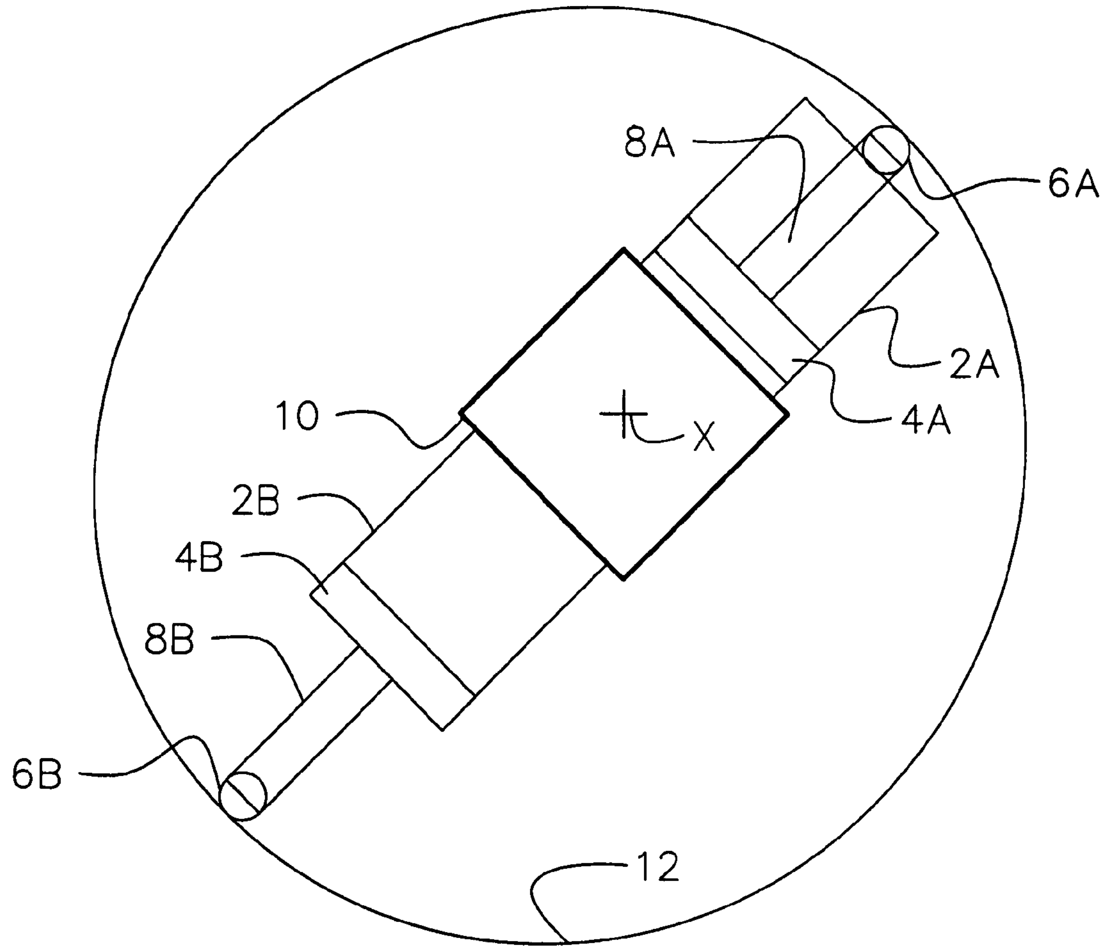
FIG. 2 illustrates schematically a two-cylinder cam-based implementation of the invention.
Figure 3:
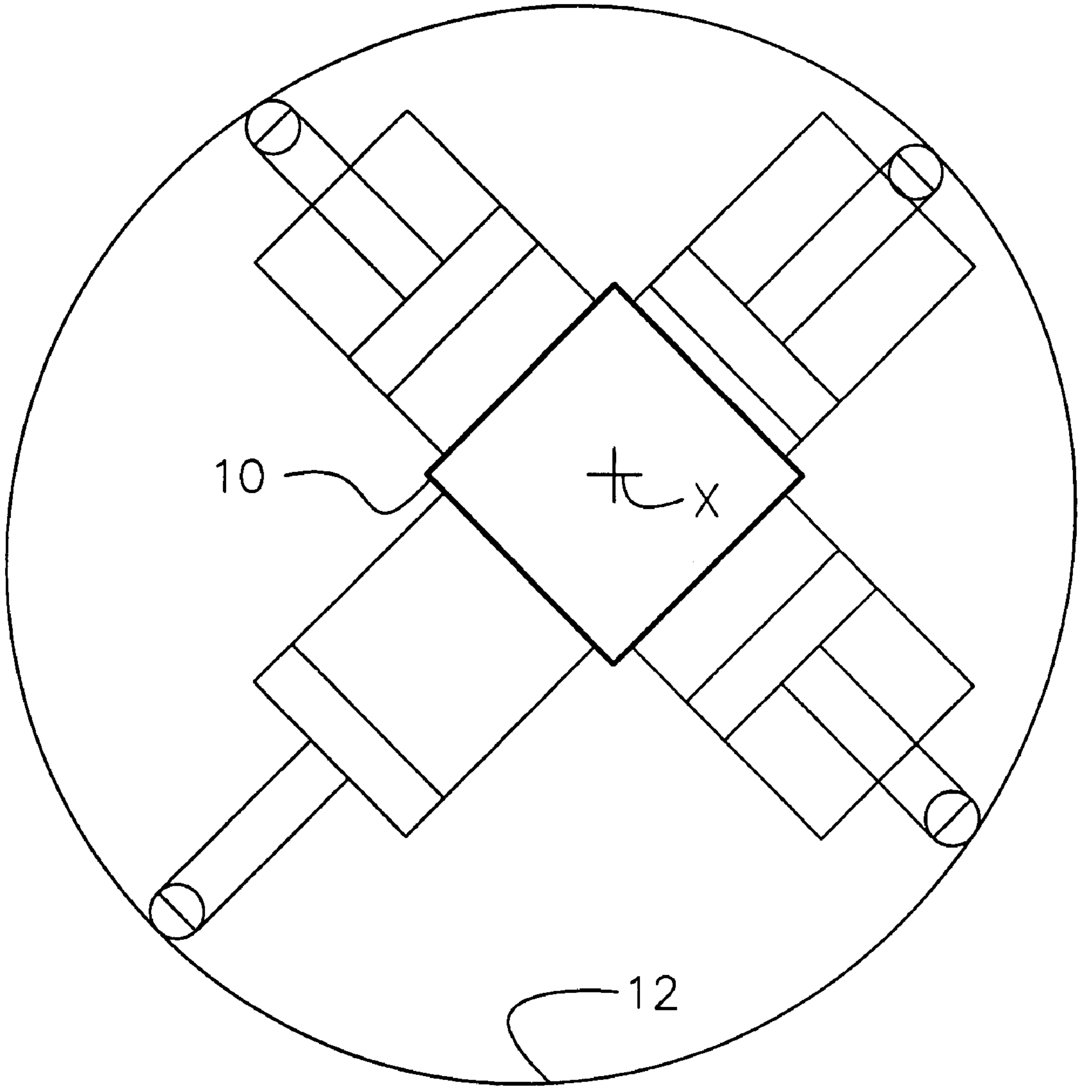
FIG. 3 illustrates schematically a four-cylinder cam-based implementation of the invention.

A two-cylinder configuration is illustrated schematically in FIG. 2. The assembly comprises two cylinders 2A and 2B containing respective pistons 4A, 4B connected to cam followers 6A, 6B by respective shafts 8A, 8B. The assembly is fixed to the rotor 10 that rotates about its axis X. The cam followers ride the inner surface of a cam 12, thereby alternately compressing and decompressing the gas in each cylinder. The cylinders are oriented so as to achieve the desired pi-radian phase relationship necessary for maximum efficiency according to Equation 7. Inasmuch as each system (as described in FIG. 1) is self-compensating, the shape of the cam as determined from the solution of Equation 17 remains the same. FIG. 3 illustrates the self-compensating system of FIG. 1 combined in a four-cylinder implementation.

Figure 4:
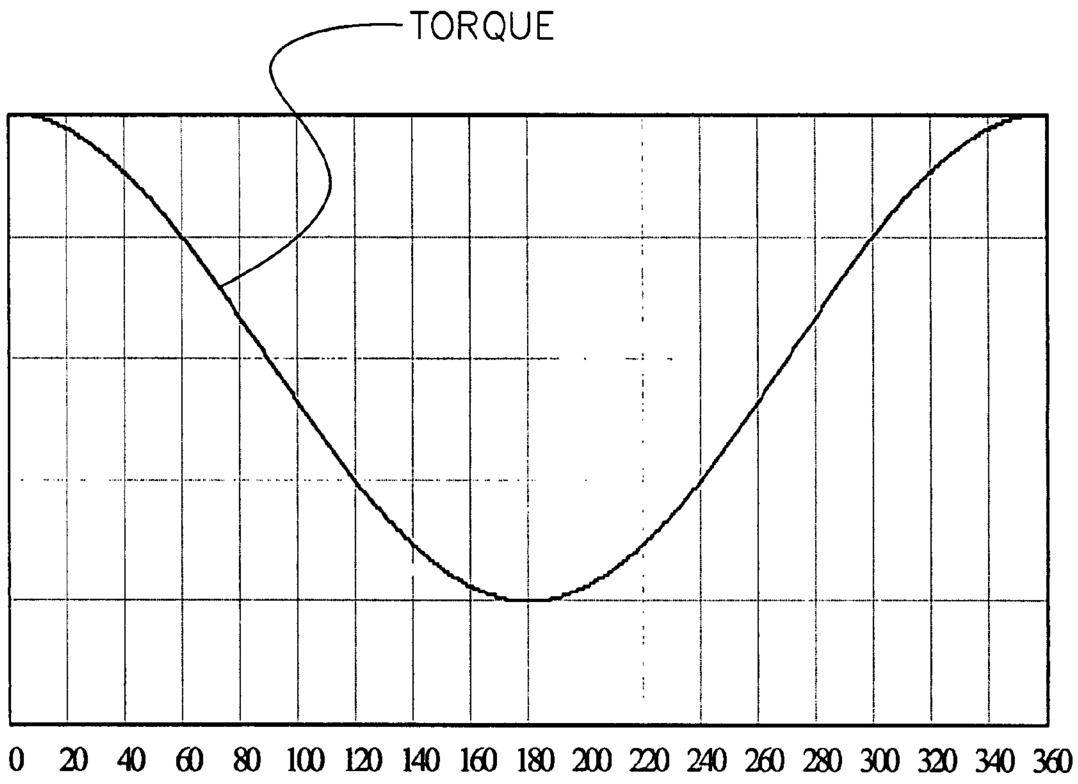
FIG. 4 is a plot of the maximum torque required to effect a differential change in rotation angle in the two-cylinder embodiment of FIG. 2 as a function of the phase difference between cylinders showing that this torque reaches a minimum when the phase difference is pi radians.

According to the purpose of the design and based on the predictions of copending Ser. No. 11/129,783, one would expect that the energy required to maintain motion as a result of compensation according to the invention would reach a minimum when the phase difference is pi radians, or 180 degrees. FIG. 4 relates to a computer-model of such cam-based coupling of two cylinders, as shown in FIG. 2, verifying the efficacy of the invention. The curve T is a

Variable-Length Connecting Rod Embodiment

The usual coupling of pistons to a common coordinate is accomplished using a crankshaft with a connecting rod of variable length. The common coordinate is the crankshaft angle. The volume of the cylinder as a function of this angle is given by $$V(\theta)=V_s\left(\begin{array}{l}\frac{1}{2}\left(\frac{(r_c+1)}{(r_c-1)}+\cos(\theta)\right)+\\ \frac{b}{L_s}\left(1-\cos\left(\arcsin\left(\frac{L_s}{2b}\sin(\theta)\right)\right)\right)\end{array}\right), \tag{18}$$

where b is the length of the connecting rod R between the journal of the crank C and the piston P, $L_s$ is the stroke length, and $r_c$ is the compression ratio. If one, again, wishes to employ air as the working substance and assumes a compression ratio of 10, then the parameter r defined above, in terms of Equation 18 becomes $$r(\theta)=\frac{\left(\frac{1}{2}\left(\frac{(r_c+1)}{(r_c-1)}+1\right)+\frac{b}{L_s}\right)}{\left(\begin{array}{l}\frac{1}{2}\left(\frac{(r_c+1)}{(r_c-1)}+\cos(\theta)\right)+\\ \frac{b}{L_s}\left(1-\cos\left(\arcsin\left(\frac{L_s}{2b}\sin(\theta)\right)\right)\right)\end{array}\right)} \tag{19}$$

-continued $$= \frac{\left(1.111 + \frac{b}{L_s}\right)}{\left(\frac{1}{2}(1.222 + \cos(\theta)) + \frac{b}{L_s}\left(1 - \cos\left(\arcsin\left(\frac{L_s}{2b}\sin(\theta)\right)\right)\right)\right)}.$$

Figure 5:
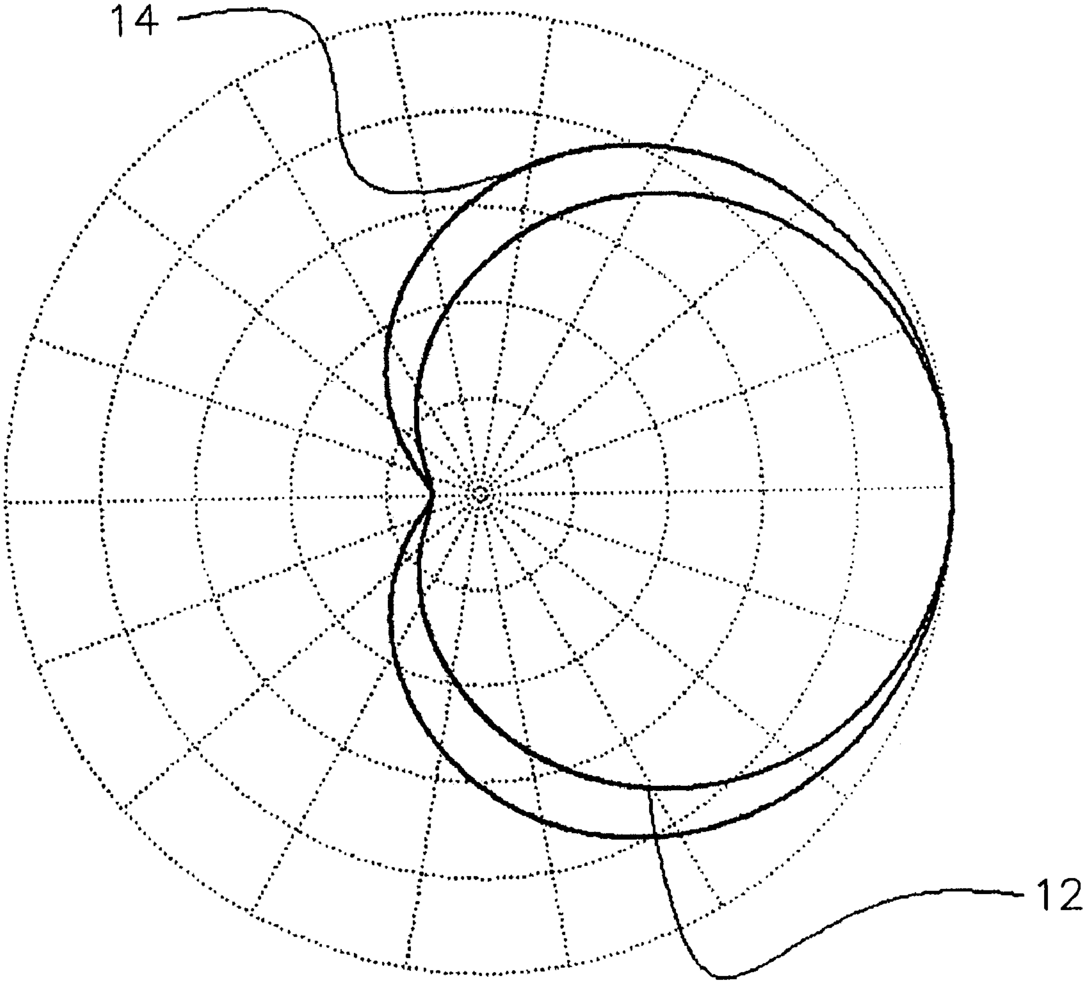
FIG. 5 is a plot of the quantity 1/r as a function of angle under conditions that produce the desired self-compensation according to Equation 17, and a corresponding plot for Equation 19 assuming a ratio $b/L_s$ equal to 1.75.

FIG. 5 shows a plot 12 of the quantity 1/r as a function of angle for Equation 17, and a corresponding plot 14 for Equation 19. The assumption for plotting Equation 19 is that the ratio $b/L_s$ is equal to 1.75, which is frequently considered "ideal" by engine designers.

Figure 6:
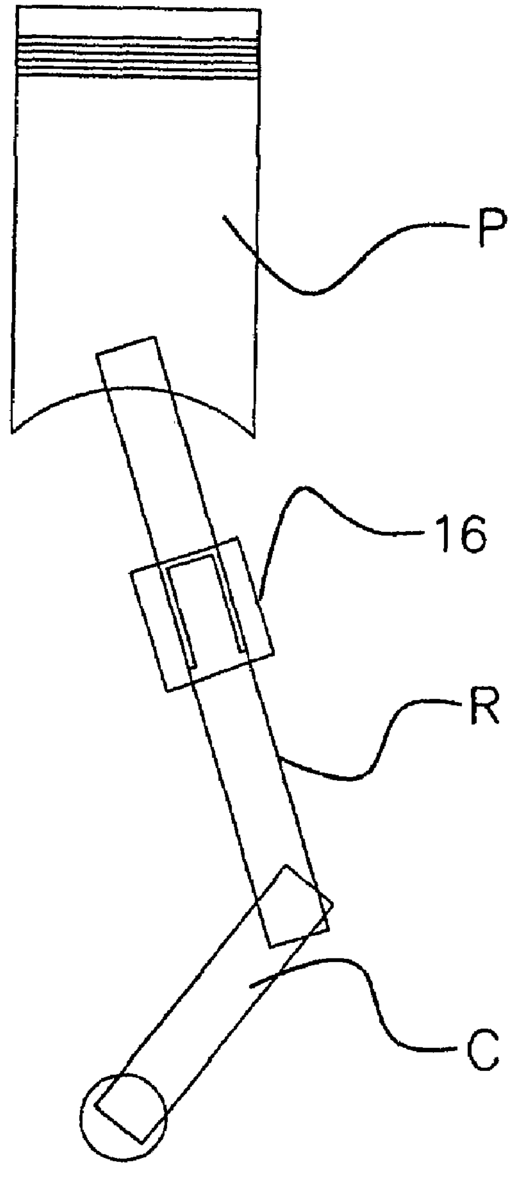
FIG. 6 is a schematic representation of a single-cylinder variable-length connecting rod implementation of the invention.

In order to allow Equations 17 and 19 to coincide, as necessary to implement the invention, the length of the connecting rod R is adjusted using a suitable mechanism 16 as a function of the angle of rotation of the crank C, as illustrated schematically in FIG. 6. To maintain compression ratio, the current coincidence points of $\theta=\alpha=0$ and $\pi$ must remain unchanged. Therefore, one can rewrite Equation 19 as $$r = \frac{2.8611}{\left(\frac{1}{2}(1.222 + \cos(\alpha(r))) + 1.75\left(1 - \lambda\cos\left(\arcsin\left(\frac{1}{3.5\lambda}\sin(\alpha(r))\right)\right)\right)\right)}, \quad (20)$$

and solve for the adjustment parameter λ to determine how the length of the connecting rod R must change as a function of crank angle.

Figure 7:
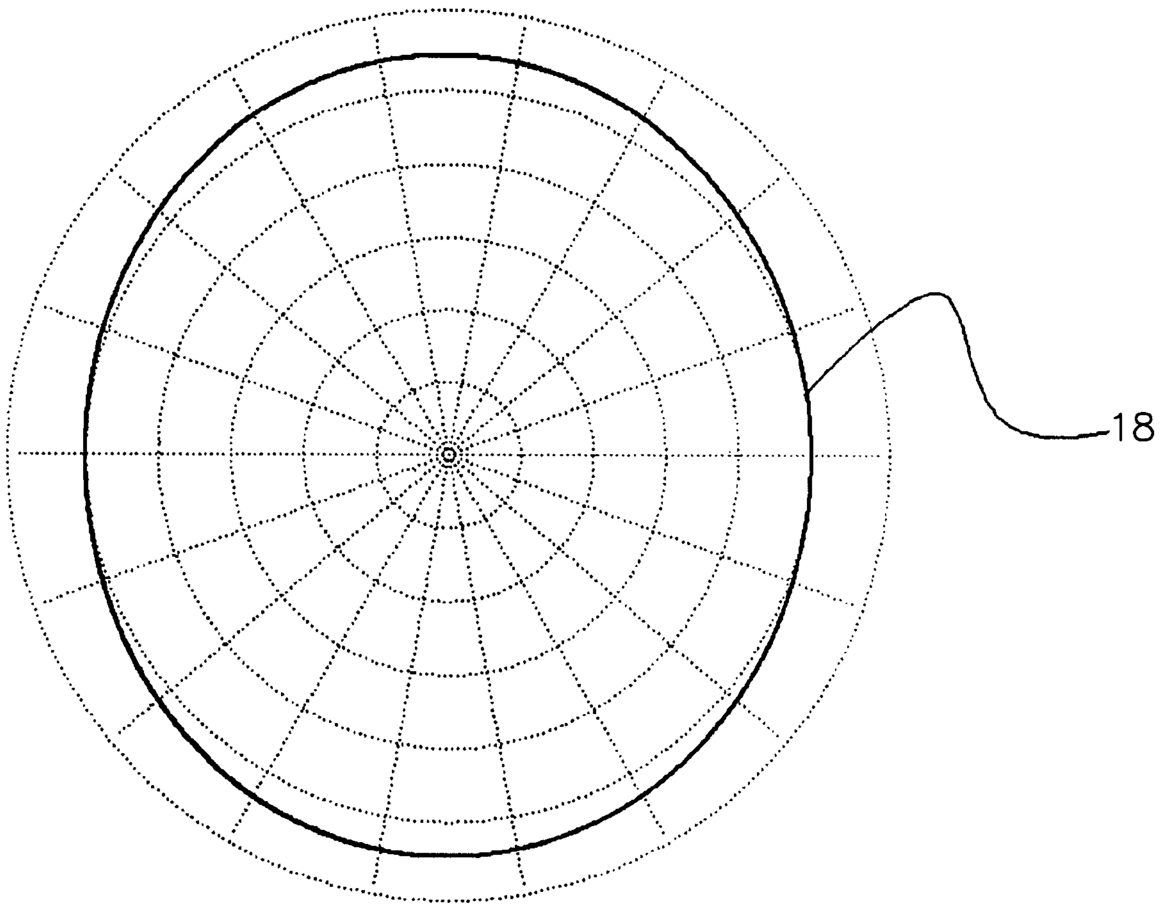
FIG. 7 is a polar plot of the adjustment parameter required to determine how the length of the connecting rods of the embodiment of FIG. 5 must change as a function of crank angle.

FIG. 7 shows a polar plot 18 of the solution for λ based on Equation 18. If the length of the connecting rod R is adjusted according to this solution as a function of crank angle, then the piston/cylinder volume becomes self-compensating. That is, any two pistons coupled to the crankshaft pi radians out of phase and whose connecting rods change length in the manner so determined will require no net torque to rotate the crankshaft.

Note that the prior art teaches how the mechanism 16 for a variable-length connecting rod can be implemented. U.S. Pat. No. 6,202,622, No. 5,077,976 and No. 4,966,109, mentioned above, are three examples of different mechanical and hydraulic implementations suitable to practice the invention. Each could be used as described subject only to design parameters adapted to fulfill the variable-length relationship dictated by Equation 18 or, more generally, Equation 6.

In view of the foregoing, the invention is viewed, without limitation, as any system wherein the volume of an enclosure and a coordinate within the system are coupled in a manner that can be represented by the equation $$[p_a - p(V(\alpha))]\frac{\partial V}{\partial \alpha} = W_0\left[\sum_m \left[\begin{array}{l} a_m\cos^{2m}(\alpha-\phi)\sin(\alpha-\phi) + \\ b_m\sin^{2m}(\alpha-\phi)\cos(\alpha-\phi) \end{array}\right]\right], \quad (21)$$

where $W_0$ is an integration constant derived from Equation 6. When two or more such identical systems are combined such that each volume and common coordinate are related according to Equation 21, the differential work required to differentially alter the coordinate vanishes.

The invention has been illustrated in terms of self-compensating systems that can be combined with identical systems to produce two- and four-cylinder arrangements in the manner described above, but those skilled in the art will readily understand that other combinations of cylinders may be used to implement the invention so long as coupled according to the principles taught herein. The invention, as described, couples 2N systems in pairs such that each pair has a phase difference of pi radians. This construction is a result of the system operation having a cycle length of 2-pi radians. If the cycle length, with respect to the common coordinate, a, is some integer-multiple of 2-pi radians (i.e., the cycle length is 2n-pi radians, where n>l), then there must be 2nN coupled systems for compensation to occur. Where the 2-pi radian cycle length employs pairs of systems to compensate each other, a 2n-pi cycle length employs 2n systems to compensate each other. These 2n systems will have a phase relationship with each other of some multiple of pi/2n radians.

So, generally, to achieve compensation of a set of enclosures whose volumes vary consistent with Equation 6 and a cycle length of 2n-pi radians, the set must include an integer-number of subsets comprising 2n such enclosures having a non-redundant phase relationship with each other of pi/2n radians. For example, a four-cycle piston engine has a cycle length, with respect to its crankshaft angle, of 4-pi radians. That is, there is a pi/2 radian intake stroke, a pi/2 radian compression stroke, a pi/2 radian power stroke, and a pi/2 radian exhaust stroke. So, implementation of a maximally efficient four-stroke engine would require that the piston position in the cylinder as a function of crankshaft angle be consistent with Equation 6. Further, since 4-pi=2n-pi leads to n=2, 2n=4 cylinders must be coupled such that they exhibit a non-redundant, integer-multiple of pi/2n=pi/4 phase relation between them, i.e., the phase relationship would be 0, pi/4, pi/2, and 3-pi/4 radians for the 4 cylinders with respect to one of those cylinders.

Thus, while the invention has been shown and described in what are believed to be the most practical and preferred embodiments, it is recognized that departures can be made therefrom within the scope of the invention. For example, the optimization of the invention may be carried out in similar fashion in an engine, for which the implementation of FIG. 5 is preferred, or in a compressor device, for which the embodiments of either FIG. 1 or FIG. 5 may be used. Therefore, the invention is not to be limited to the details disclosed herein, but is to be accorded the full scope of the claims so as to embrace any and all equivalent apparatus and methods.

I claim:

1. A self-compensating system comprising:

an enclosure defining a volume, said volume being variable during a repeating cycle of operation of the system as a function of a predetermined change in a coordinate in the system such that, when the system is coupled with another said system of identical design through said coordinate, a total force necessary to vary the coordinate in both systems is substantially zero.

2. The system of claim 1, wherein said system includes a cam.

3. The system of claim 2, wherein said systems are coupled through said cam, the cam being shared by both systems.

4. The system of claim 1, wherein said system includes a variable-length connecting rod.

5. The system of claim 4, wherein said enclosure is a cylinder and a pair of said cylinders is coupled in a two-cycle engine.

6. The system of claim 4, wherein said enclosure is a cylinder and four of said cylinders are coupled in a four-cycle engine.

7. The system of claim 4, wherein said enclosure is a cylinder and a pair of said cylinders is coupled in a compressor.

8. The system of claim 1, wherein said enclosure is a cylinder and a pair of said cylinders is coupled in a two-cycle engine.

9. The system of claim 8, wherein said cylinders are coupled through a cam and a cam follower connected to a connecting rod of each cylinder, said cam being shared by all of said cylinders.

10. The system of claim 1, wherein said enclosure is a cylinder and four of said cylinders are coupled in a four-cycle engine.

11. The system of claim 7, wherein said cylinders are coupled through a cam and a cam follower connected to a connecting rod of each cylinder, said cam being shared by all of said cylinders.

12. The system of claim 1, wherein said enclosure is a cylinder and a pair of said cylinders is coupled in a compressor.

13. The system of claim 12, wherein said cylinders are coupled through a cam and a cam follower connected to a connecting rod of each cylinder, said cam being shared by all of said cylinders.

14. A self-compensating system comprising:

an enclosure defining a volume, said volume being variable during a repeating cycle of operation of the system as a function of a predetermined change in a coordinate in the system, said volume varying with respect to said coordinate in a manner represented mathematically with the relation $$[p_a - p(V(\alpha))]\frac{\partial V}{\partial \alpha} = W_0\left[\sum_m \begin{bmatrix} a_m\cos^{2m}(\alpha-\phi)\sin(\alpha-\phi) + \\ b_m\sin^{2m}(\alpha-\phi)\cos(\alpha-\phi) \end{bmatrix}\right]$$

wherein $p_a$ is ambient pressure; p is pressure within said enclosure, V is said volume, $\alpha$ is said coordinate; $a_m$ and $b_m$ are coefficients of a numerical series that satisfies the relation; m is an index of the series; $\phi$ is a phase of said cycle of operation with reference to said coordinate; and $W_0$ is a constant of integration.

15. The system of claim 14, wherein said enclosure is a cylinder and a pair of said cylinders is coupled in a two-cycle engine.

16. The system of claim 15, wherein said cylinders are coupled through a cam and a cam follower connected to a connecting rod of each cylinder, said cam being shared by all of said cylinders.

17. The system of claim 15, wherein said enclosure is a cylinder and four of said cylinders are coupled in a four-cycle engine.

18. The system of claim 17, wherein said cylinders are coupled through a cam and a cam follower connected to a connecting rod of each cylinder, said cam being shared by all of said cylinders.

19. The system of claim 15, wherein said enclosure is a cylinder and a pair of said cylinders is coupled in a compressor.

20. The system of claim 19, wherein said cylinders are coupled through a cam and a cam follower connected to a connecting rod of each cylinder, said cam being shared by all of said cylinders.

21. The system of claim 15, wherein said system includes a variable-length connecting rod.

22. The system of claim 21 wherein said enclosure is a cylinder and a pair of said cylinders is coupled in a two-cycle engine.

23. The system of claim 21, wherein said enclosure is a cylinder and four of said cylinders are coupled in a four-cycle engine.

24. The system of claim 21, wherein said enclosure is a cylinder and a pair of said cylinders is coupled in a compressor.

25. A method of self-compensating a plurality of systems, wherein each system includes an enclosure that defines a volume that varies during a repeating cycle of operation as a function of a change in a coordinate in the system, said method comprising the following steps:

providing a mechanical coupling of said plurality of enclosures through said coordinate in the system; and varying said volume defined by each enclosure with respect to said coordinate in a manner represented mathematically with the relation $$[p_a - p(V(\alpha))]\frac{\partial V}{\partial \alpha} = W_0\left[\sum_m \begin{bmatrix} a_m\cos^{2m}(\alpha-\phi)\sin(\alpha-\phi) + \\ b_m\sin^{2m}(\alpha-\phi)\cos(\alpha-\phi) \end{bmatrix}\right],$$

wherein $p_a$ is ambient pressure; p is pressure within said enclosure, V is said volume, $\alpha$ is said coordinate; $a_m$ and $b_m$ are coefficients of a numerical series that satisfies the relation; m is an index of the series; $\phi$ is a phase of said cycle of operation with reference to said coordinate; and $W_0$ is a constant of integration.

26. The method of claim 25, wherein said enclosure is a cylinder and a pair of said cylinders is coupled in a two-cycle engine.

27. The method of claim 26, wherein said cylinders are coupled through a cam and a cam follower connected to a connecting rod of each cylinder, said cam being shared by all of said cylinders.

28. The method of claim 25, wherein said enclosure is a cylinder and four of said cylinders are coupled in a four-cycle engine.

29. The method of claim 28, wherein said cylinders are coupled through a cam and a cam follower connected to a connecting rod of each cylinder, said cam being shared by all of said cylinders.

30. The method of claim 25, wherein said enclosure is a cylinder and a pair of said cylinders is coupled in a compressor.

31. The method of claim 30, wherein said cylinders are coupled through a cam and a cam follower connected to a connecting rod of each cylinder, said cam being shared by all of said cylinders.

32. The method of claim 25, wherein said system includes a variable-length connecting rod.

33. The system of claim 32 wherein said enclosure is a cylinder and a pair of said cylinders is coupled in a two-cycle engine.

34. The system of claim 32, wherein said enclosure is a cylinder and four of said cylinders are coupled in a four-cycle engine.

35. The system of claim 32, wherein said enclosure is a cylinder and a pair of said cylinders is coupled in a compressor.

* * * * *